Oct. 26, 1948.    L. D. RUNKLE    2,452,070
RESISTANCE WELDING FORGING PRESSURE CONTROL
Filed Jan. 25, 1945    2 Sheets-Sheet 1

INVENTOR.
LLOYD DANIEL RUNKLE,
BY Elmer J. Goen
ATTY.

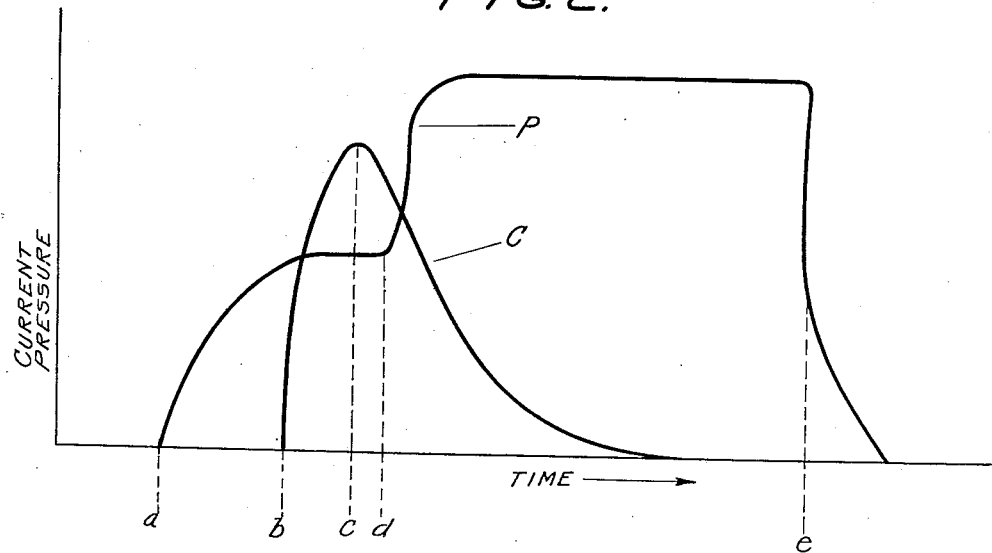

Patented Oct. 26, 1948

2,452,070

UNITED STATES PATENT OFFICE 2,452,070

RESISTANCE WELDING FORGING PRESSURE CONTROL

Lloyd Daniel Runkle, Gloucester, Mass., assignor to Raytheon Manufacturing Company, Newton, Mass., a corporation of Delaware Application January 25, 1945, Serial No. 574,542

11 Claims. (Cl. 219—4)

This invention relates to a solenoid control circuit, and particularly to such a circuit for the energization of a solenoid valve or equivalent device, and has for its principal object to insure that the valve or other device controlled by the solenoid will be actuated quickly and its operation accurately timed.

In some applications, for example, in resistance spot welding, it is desirable to accurately time the actuation of a solenoid operated valve, such as the forging pressure valve. Forging pressures which are timed from the initial application of pressure are subject to error because friction of the cylinder and ways of the welding machine cause variations in the time required to reach welding pressure in successive welds. Furthermore, small differences in the physical condition of the valve may result in large differences in the energy required to actuate the same. Thus, if the valve sticks slightly, it may not operate as quickly as it would otherwise. In such cases the application of the forging pressure will be delayed relative to the flow of welding current through the work and the resulting weld may be defective. Where a succession of spot welds are made upon a given piece of work, the welds may lack uniformity due to such difference in timing of the application of the forging pressure to successive welds.

It is among the objects of the present invention to insure that such valves or equivalent devices will be actuated at high speed, and accurately timed.

In certain applications it is desirable that the operator be permitted to control the timing of the actuation of a solenoid operated valve within wide limits relative to some other operation in the system. For example, in resistance spot welding, it is desirable to change the timing of the application of the forging pressure relative to the flow of welding current to secure the most satisfactory welds for various types of work; that is to say, where the kind of material or the thickness of the material comprising the work is altered, it is desirable to alter the form of the welding current wave and this in turn requires a change in the timing of the application of the forging pressure relative to the current wave to secure the most satisfactory results for the given conditions.

It is a further object of the invention to provide a system in which the application of the forging pressure to the work may be varied at the will of the operator while insuring that, for any given setting, the actuation of the valve will be quick and accurate.

To these and other ends the invention contemplates a system in which a high voltage direct current impulse is supplied to the solenoid, which impulse is sufficient to insure that the valve will always be actuated quickly regardless of operating conditions and accordingly accurately timed with respect to some other function of the system, such as, the application of welding current. Since this initial impulse for actuating the valve is far greater than is necessary to hold the valve in its operative position, and since it is desirable to prevent the solenoid from being overheated by such high currents, the invention also contemplates that the initial high voltage direct current impulse be automatically followed by a low voltage holding current.

The above and other objects and features of the invention will be made fully apparent to those skilled in the art from a consideration of the following detailed description taken in conjunction with the accompanying drawings in which:

Fig. 2 is a set of curves illustrating certain operating characteristics of the invention.

Figure 1:
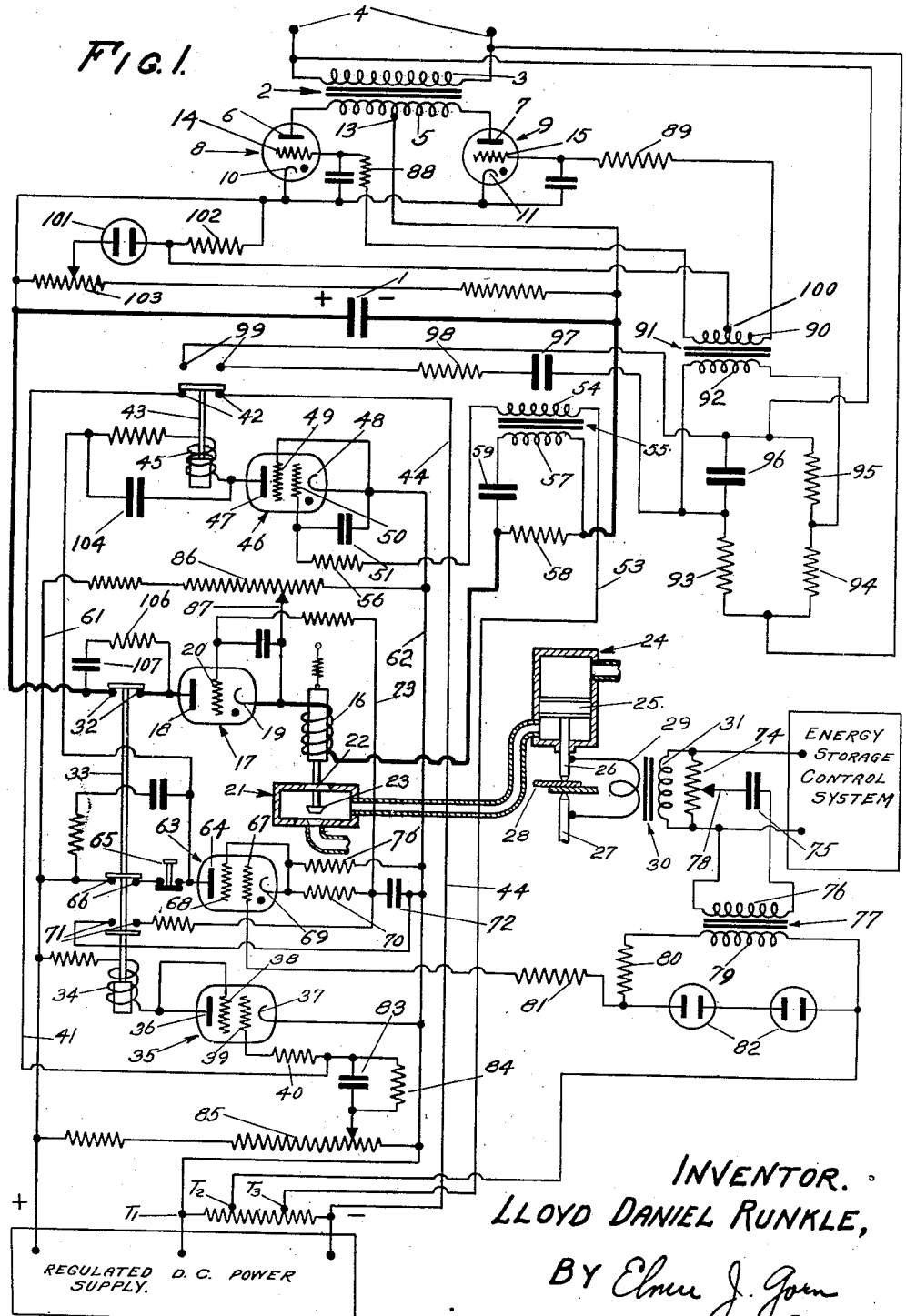
Fig. 1 illustrates diagrammatically one embodiment of the invention.

Referring to the drawings, a condenser 1 is adapted to be charged from a controlled source which, in the instance shown, includes a transformer 2 having its primary winding 3 connected across a source of alternating current 4, and the ends of its secondary winding 5 connected to the anode plates 6 and 7 of rectifying tubes 8 and 9 respectively. Tubes 8 and 9 have continuously energized cathodes 10 and 11 jointly connected to the positive side of condenser 1. A central tap 13 on the secondary winding 5 is connected to the negative side of the condenser 1. The tubes 8 and 9 are controlled by grids 14 and 15 in a manner to be hereinafter more particularly described.

The condenser 1 is adapted to be discharged through a circuit including a solenoid 16, the discharge being controlled by a gas tube 17 having a plate 18, cathode 19 and a control grid 20. In the instance shown, the energization of the solenoid 16 by the discharge of condenser 1 therethrough actuates a fluid pressure control device 21 having a valve 22 adapted to be opened upon the energizing of the solenoid 16 to relieve the pressure within an interior chamber of the device 21, and a valve 23 actuated simultaneously with the opening of the valve 22 to close communication between the interior chamber of the device 21 and a suitable source of regulated pressure. The interior chamber of the device 21 is in communication with a welding machine pressure cylinder 24 at a point below the pressure piston 25. Pressure piston 25 is adapted to apply pressure to one of the electrodes 26, of a spot welding system having a stationary electrode 27, to thereby apply pressure to the work 28 between said electrodes. Current is supplied to the welding electrodes 26 and 27 from a loop 29 constituting the secondary of a transformer 30 having a primary winding 31 adapted to be energized from any suitable energy storage and control system. Such energy storage and control systems are known in the art. For one suitable example of such a system reference is made to the U. S. Patent No. 2,250,102, July 22, 1941, to Hans Klemperer. Other suitable systems will be known to those skilled in the art.

The circuit through the solenoid 16 also contains a pair of contacts 32 normally closed by relay 33 actuated by a solenoid 34. By normally closed, I mean that the contacts are closed unless the solenoid is energized. The solenoid 34 is energized from a regulated D. C. power supply (shown in block) through a tube 35 having a plate 36 connected through the solenoid 34 to the positive terminal of said power supply and a cathode 37 connected to one of the terminals $T_1$ thereof, which terminal $T_1$ is negative relative to said positive terminal. The tube 35 is also provided with a screen 38 which may be directly connected to the plate 36 and a grid. The grid 39 is connected through a resistor 40 and lead 41 to the contacts 42 of a relay 43 and thence by way of a lead 44 to a negative terminal of said power supply.

The relay 43 controlling the contacts 42 is actuated by a solenoid 45 which is in series with a control tube 46. The tube 46 has its plate 47 connected through a winding of the solenoid 45 and a control circuit, hereinafter to be described, to the positive terminal of the D. C. power supply. Its cathode 48 is connected to the terminal $T_1$ of said supply, and its shield grid 49 is directly connected to the cathode 48. The grid 50 is coupled to the cathode through a condenser 51 and is also connected to terminal $T_3$ through the lead line 53, the secondary winding 54 of a transformer 55 and a resistor 56. The primary winding 57 of transformer 55 is connected across a resistor 58 in the discharge circuit of condenser 1, a condenser 59 being interposed between the resistor 58 and one end of the primary winding 57.

Connected across the lines 61 and 62 leading from the positive terminal and from the terminal $T_1$ respectively of the D. C. power supply is a tube 63 having its plate 64 connected to said line 61 through a push button 65 and a second pair of normally closed contacts 66 of the relay 33. The tube 63 is also provided with a grid 67, a shield grid 68 and a cathode 69. The cathode 69 is connected to the line 62 through a resistor 70 and a condenser 72. A third pair of contacts 71 of the relay 33 is normally open and is adapted to close a shunt circuit across condenser 72. The junction between the resistor 70 and the condenser 72 is also connected by a line 73 to the grid 20 of tube 17.

In order to energize the grid 67 of the tube 63 in synchronism with the welding impulse through the electrodes 26 and 27, I provide a resistor 74 in parallel with primary winding 31 of welding transformer 30 which resistor functions as a voltage divider. A circuit comprising a condenser 75 and the primary winding 76 of a transformer 77 is connected across a portion of the resistor 74, the portion being variable by means of the adjustable arm 78. The secondary winding 79 of the transformer 77 has one end thereof connected to the grid 67 through resistors 80 and 81. The other end of the secondary winding 79 is connected to tap $T_2$ of the D. C. power supply. Glow tubes 82 are connected across the secondary winding 79 forming with resistors 80 and 81 a protective network for the grid circuit of tube 63.

The grid circuit of tube 35 includes a condenser 83 and a resistor 84 in parallel and connected at one end to resistor 40 and adjustably connected at the other end to a resistor 85. The resistor 85 is connected across the lines 61 and 62 and functions as a voltage divider. A second voltage divider 86 is also connected across lines 61 and 62 and the cathode 19 of tube 17 is adjustably connected thereto by the arm 87.

The grids 14 and 15 of the tubes 8 and 9 of the full-wave rectifier are connected by way of resistors 88 and 89 respectively to the opposite ends of the secondary winding 90 of a transformer 91 having a primary winding 92. The primary winding 92 is energized by alternating current supplied from the source 4 by way of a bridge structure including ressitors 93, 94 and 95 in three of the arms thereof and a condenser 96 in a fourth arm. A condenser 97 and a resistor 98 in series are connected across the condenser 96 through a pair of normally open contacts 99 of relay 43. A central tap 100 on the secondary winding 90 is connected to a junction between a glow tube 101 and a resistor 102. Glow tube 101 is adjustably connected to a resistor 103 which resistor provides a voltage divider connected across the condenser 1. The resistor 102 is connected to the positive side of condenser 1.

The operation of the system described above will be explained in conjunction with the set of curves shown in Fig. 2 which represents, in a general qualitative, rather than a quantitative manner, the relation between the timing of the welding current and the application of the forging pressure to the work. Referring to this figure the curve C represents the impulse of a welding current through the work and the curve P represents the application of welding and forging pressure to the work. The pressure cycle is initiated at the point $a$ and the pressure rises to a predetermined value corresponding to the difference between the pressure above the piston 25 and the pressure below the piston. At a point $b$ the current flow through the work is initiated and rises rapidly to a peak value at $c$, and thereafter decays at a rate determined by the parameters of the welding circuit, usually substantially exponentially. At the point $d$ subsequent to the current peak at $c$ the pressure applied to the work is increased, as indicated by the sharp rise in the curve P, to a predetermined value constituting the forging pressure. It is desirable to control the initiation of the increase in pressure at $d$ relative to the current wave C. In practice the current wave may be varied over wide limits both in length and in magnitude. The period represented by the distance *a—b* from the initiation of the welding pressure to the initiation of the welding current in practice may vary over wide limits. For this reason the invention contemplates construction in which the point *d* may be variably timed with reference to the initiation of the welding current at *b* rather than the initiation of welding pressure at *a*. It will be understood that the chamber above the piston 25 is adapted to be connected to a source of pressure equal to the desired forging pressure and that when the valve 23 is in open position the space below the piston 25 is connected to a source of pressure which is greater than atmospheric but less than that of the pressure source to which the upper end space of cylinder 24 may be connected. Prior to the time *a*, the space above the piston 25 will be disconnected from the forging pressure source and the pressure in this space will be relieved to atmosphere. At this time, since the valve 22 is closed and the valve 23 is open, the pressure below the piston 25 will be greater than the pressure above the piston and the piston will be raised so that the electrode 26 is not in contact with the work. At the point *a*, the space above the piston is connected to the source of forging pressure. The electrode 26 closes upon the work at this point and the pressure applied to the electrode rises to the welding pressure. This welding pressure is determined by the difference between the pressure above the piston and that below the piston, the valve 22 being still closed and the valve 23 open at this time. This welding pressure is indicated by the flat stepped portion of the pressure wave. After the pressure applied to the work attains the welding pressure at the time *b* the energy storage control system supplies a welding impulse through the transformer 30 to the work 28. A very high potential appears across the terminals of the primary winding 31 of this transformer. A portion of this energy is supplied by the voltage divider, comprising the resistor 74, to the primary winding 76 of transformer 77 through condenser 75. The time constant for charging condenser 75 from resistor 74 is very small compared to the decay time constant of the welding circuit. Consequently condenser 75 charges very rapidly through the primary of transformer 77. This narrow but high peak in the primary 76 produces a secondary peak which is applied in positive polarity to the control grid 67 of the tube 63. The tube 63, which is normally non-conducting by virtue of the negative volage on grid 67 through the secondary of transformer 77, is caused to conduct by the positive impulse from the transformer and commences to charge condenser 72 through resistor 70. Resistor 70' is a keep-alive circuit for tube 63 when the condenser 72 becomes charged. Tube 17 has its cathode connected to the potentiometer 86, which potentiometer is a voltage divider connected across lines 61 and 62 to establish a positive voltage on the cathode of this tube. As the condenser 72 becomes charged, the potential of the grid of 17 approaches the critical voltage from its initial value which is more negative than the cathode. At the critical voltage of the tube 17, this tube conducts and discharges current from condenser 1 into solenoid 16 through the resistor 58. The solenoid 16 opens the valve 22 and closes the valve 23 and thus releases the pressure below the piston 25 to the atmosphere. Simultaneous with the opening of valve 22, valve 23 is closed, closing communication between the lower side of the piston 25 and the source of pressure. Accordingly the full force of the pressure above the piston becomes effective upon the electrode 26 to increase the pressure to the predetermined forging value.

The discharge of the condenser 1 through the solenoid 16 and the resistor 58 causes a pulse to be formed in the primary 57 of transformer 55 as condenser 59 differentiates the discharge. Tube 46 is normally non-conductive by virtue of the negative voltage on the grid 56 through the secondary winding 54 of transformer 55. The pulse formed in the primary of transformer 55 is amplified in the transformer and triggers the tube. The conduction of tube 46 causes relay 43 to become energized. One pair of contacts 42 of the relay 43 is connected to grid circuit of the tube 35 and serves to hold this tube non-conductive. When the contacts 42 are opened, the charge established on condenser 83, which is such as to maintain negative the potential on the grid 39 of the tube 35, leaks off through resistor 34. The grid 39 of the tube 35 then becomes positive and the tube conducts sufficient current to energize relay 33. Variable time delay is effected by varying the potential on the delay condenser 83 with the divider 85.

Relay 33 then breaks the anode circuits of the tube 63 and of the tube 46 by opening contacts 66. Simultaneously the anode circuit of tube 17 is broken by opening contacts 32 and the timing condenser 72 is short-circuited by closing contacts 71. This retsores these circuits to their original state. Relay 43 thus becomes deenergized closing the contacts 42 and thus extinguishing tube 35 by placing bias voltage on the control grid 39. The condenser 104 is connected across solenoid 45 of relay 43 to hold the relay closed momentarily after the supply voltage is removed by relay 33.

The initial discharge of condenser 1 is fully adequate to open the pressure relief valve 22 and close the pressure supply valve 23 under all operating conditions. If the solenoid 16 continued to be supplied with such a high current the coil might be damaged. The rectifier would normally supply more than enough current to maintain the control device 21 in its energized position. To prevent excessive current from overheating the solenoid 16, the closure of contacts 99 introduces additional phase shift into the rectifying system and thus reduces the rectifier output current to a small value sufficient to hold the device in energized position. The phase shift circuit comprises the resistors 93, 94 and 95 and the condenser 96. A phase shifted voltage is applied to the grids 14 and 15 of the tubes 8 and 9 to control the output of the rectifier circuit and it will be understood that the introduction of the condenser 97 and resistor 98 upon the closure of contacts 99 introduces an additional phase shift into this circuit to further reduce the output from the rectifier.

The voltage to which the coindenser 1 is charged is determined by the setting of the slide upon the resistor 103 which together with the glow tube 101 functions as a voltage regulator. This circuit applies to the grids 14, 15 of the rectifier tubes 8 and 9 an increasing bias as the charge on the condenser 1 increases. This bias is applied to the grids 14 and 15 by way of the center tap 100 on secondary winding of the transformer 91. Thus the current to the condenser 1 from the full-wave rectifier circuit is relatively high until the charge on the condenser reaches the predetermined value. Thereafter the charge is maintained constant by applying to grids 14 and 15 an alternating voltage which is phase shifted with regard to the anode voltage. This supplies a trickle current to the condenser 1 to maintain the charge thereon at the predetermined value. This arrangement permits the rapid charging of the condenser and maintains it at a value sufficient to cause the instantaneous actuation of the control device 21 upon conduction of tube 17. However, this high charging current is not supplied to the solenoid 16 after the discharge of the condenser 1 therethrough, for the current at this time will come directly from the full-wave rectifier and this will be limited by the increased shift of the phase shifting circuit due to the closure of contacts 99. The high charging current will not again be applied to condenser 1 until these contacts are open at a time when the tube 17 is non-conductive.

In order to prevent or limit any arcs that may be formed by the opening of the various contacts, circuits containing a resistor such as 106 and a condenser such as 107 may be connected across the contacts.

It will be apparent to those skilled in the art that the parameters of the various circuits comprising the system shown may vary over wide limits depending upon the particular application of the invention, and the power requirements of the control device. In one successful embodiment of the invention, where the voltage required across the condenser 1 to insure prompt and sudden actuation of the control device 21 under all circumstances was 600 volts, this condenser had a capacity of 135 $\mu f$. The tube used at 17 for controlling the discharge of the condenser was a WL677. Tubes 46 and 63 were both gas tetrodes of the 2050 type. Tube 35 was a 6V6. Other suitable tubes may be selected by those skilled in the art.

From the foregoing it will be seen that the invention provides a system in which a solenoid for operating a control device is supplied with a high initial current to insure that this device will be actuated quickly, and in which the high initial current is immediately followed by much lower current for holding the device in its energized position.

Furthermore, in its application to a resistance spot welding system, the invention provides a means for applying forging pressure in accurately timed sequence to the welding current, and the time delay between the supply of welding current to the work and the application of forging pressure thereto may be accurately controlled. Likewise the duration of the application of forging pressure to the work may be controlled within wide operating limits, and with the discontinuance of the forging pressure, the system returns rapidly to its initial state, the condenser 1 being rapidly recharged so that the operation may be quickly repeated.

While there has been herein disclosed one preferred embodiment of the invention, other embodiments will be apparent to those skilled in the art from a consideration of the form shown and the teachings thereof. Accordingly a broad interpretation of the appended claims commensurate with the scope of the invention within the art is desired.

What is claimed is:

1. A system for controlling the application of forging pressure to the work in resistance spot welding, comprising a pressure control device, a solenoid for actuating said control device, a storage condenser, a controlled source of direct current for charging said condenser, a circuit for discharging said condenser through said solenoid, said circuit including a gaseous discharge tube having a control electrode, a control condenser for energizing said control electrode when the charge on said control condenser reaches a predetermined value, means responsive to the flow of a welding impulse to the work for charging said control condenser, means for varying the predetermined value of the charge on said condenser required to energize said control electrode whereby a predetermined time delay is secured between the flow of a welding impulse to the work and the energization of said solenoid, and means for supplying a low voltage holding current from said source to said solenoid following the discharge of said storage condenser therethrough.

2. A system for controlling the application of forging pressure to the work in resistance spot welding, comprising a pressure control device, a solenoid for actuating said control device, a storage condenser, a controlled source of direct current for charging said condenser, a circuit for discharging said condenser through said solenoid, said circuit including a gaseous discharge tube having a control electrode, a control condenser for energizing said control electrode when the charge on said control condenser reaches a predetermined value, means responsive to the flow of a welding impulse to the work for charging said control condenser, means for varying the predetermined value of the charge on said condenser required to energize said control electrode whereby a predetermined time delay is secured between the flow of a welding impulse to the work and the energization of said solenoid, means for supplying a low voltage holding current from said source to said solenoid following the discharge of said storage condenser therethrough, and means effective after a controlled period of time for disconnecting said solenoid from said source and thereby return said pressure control device to its normal position.

3. A system for controlling the application of forging pressure to the work in resistance spot welding, comprising a pressure control device, a solenoid for actuating said control device, a storage condenser, a controlled source of direct current for charging said condenser, a circuit for discharging said condenser through said solenoid, said circuit including a gaseous discharge tube having a control electrode, means responsive to the flow of a welding impulse to the work for energizing said control electrode, means for supplying a low voltage holding current from said source to said solenoid following the discharge of said storage condenser therethrough, and means effective after a controlled period of time for disconnecting said solenoid from said source and thereby return said pressure control device to its normal position.

4. A system for controlling the application of forging pressure to the work in resistance spot welding, comprising a pressure control device, a solenoid for actuating said control device, a storage condenser, a controlled source of direct current for charging said condenser, a circuit for discharging said condenser through said solenoid, said circuit including a gaseous discharge tube having a control electrode, means responsive to the flow of a welding impulse to the work and effective after a predetermined time delay for energizing said control electrode whereby a predetermined time delay is secured between the flow of a welding impulse to the work and the energization of said solenoid, means for supplying a low voltage holding current from said source to said solenoid following the discharge of said storage condenser therethrough, and means effective after a controlled period of time for disconnecting said solenoid from said source and thereby return said pressure control device to its normal position.

5. A system for controlling the application of forging pressure to the work in resistance spot welding, comprising a pressure control device, a solenoid for actuating said device, means responsive to the flow of a welding impulse to the work and effective after a predetermined time delay for controlling the supply of a high voltage current impulse to said solenoid, means for supplying a low voltage holding current to said solenoid immediately following said high voltage current impulse, and means effective after a controlled period of time for disconnecting said solenoid from said means for supplying a low voltage holding current and thereby return said pressure control device to its normal position.

6. A system for controlling the application of forging pressure to the work in resistance spot welding, comprising a pressure control device, a solenoid for actuating said device, means responsive to the flow of a welding impulse to the work for controlling the supply of a high voltage current impulse to said solenoid, means for supplying a low voltage holding current to said solenoid immediately following said high voltage current impulse, and means effective after a controlled period of time for disconnecting said solenoid from said means for supplying a low voltage holding current and thereby return said pressure control device to its normal position.

7. A system for controlling the application of forging pressure to the work in resistance spot welding, comprising a pressure control device, a solenoid for actuating said device, means responsive to the flow of a welding impulse to the work for controlling the supply of a high voltage current impulse to said solenoid, and means for supplying a low voltage holding current to said solenoid immediately following said high voltage current impulse.

8. A system for controlling the application of forging pressure to the work in resistance spot welding, comprising a pressure control device, a solenoid for actuating said device, a storage condenser, a source of current for charging said condenser, means responsive to the flow of a welding impulse to the work and effective after a predetermined time delay for controlling the supply of a high voltage current impulse to said solenoid from said storage condenser, means for supplying a low voltage holding current to said solenoid from said source immediately following said high voltage current impulse, and means effective after a controlled period of time for disconnecting said solenoid from said source and thereby return said pressure control device to its normal position.

9. A system for controlling the application of forging pressure to the work in resistance spot welding, comprising a fluid pressure control device, a solenoid for actuating said control device, a storage condenser, a controlled source of direct current for charging said condenser, a circuit for discharging said condenser through said solenoid, said circuit including a gaseous discharge tube having a control electrode, a control condenser for energizing said control electrode when the charge on said control condenser reaches a predetermined value, means responsive to the flow of a welding impulse to the work for charging said control condenser, means for varying the predetermined value of the charge on said condenser required to energize said control electrode whereby a predetermined time delay is secured between the flow of a welding impulse to the work and the energization of said solenoid, means for supplying a low voltage holding current from said source to said solenoid following the discharge of said storage condenser therethrough, a relay having a pair of normally closed contacts in said circuit between said storage condenser and said solenoid, and means effective after a controlled period of time for energizing said relay to disconnect said solenoid from said source and thereby return said pressure control device to its normal position.

10. A system for controlling the application of forging pressure to the work in resistance spot welding, comprising a fluid pressure control device, a solenoid for actuating said control device, a storage condenser, a controlled source of direct current for charging said condenser, a circuit for discharging said condenser through said solenoid, said circuit including a gaseous discharge tube having a control electrode, a control condenser for energizing said control electrode when the charge on said control condenser reaches a predetermined value, means responsive to the flow of a welding impulse to the work for charging said control condenser, means for varying the predetermined value of the charge on said condenser required to energize said control electrode whereby a predetermined time delay is secured between the flow of a welding impulse to the work and the energization of said solenoid, means for supplying a low voltage holding current from said source to said solenoid following the discharge of said storage condenser therethrough, a relay having a pair of normally closed contacts in said circuit between said storage condenser and said solenoid, means effective after a controlled period of time for energizing said relay to disconnect said solenoid from said source and thereby return said pressure control device to its normal position, and a second pair of normally closed contacts on said relay adapted to be opened by the energization thereof to open the charging circuit of said control condenser.

11. A system for controlling the application of forging pressure to the work in resistance spot welding, comprising a fluid pressure control device, a solenoid for actuating said control device, a storage condenser, a controlled source of direct current for charging said condenser, a circuit for discharging said condenser through said solenoid, said circuit including a gaseous discharge tube having a control electrode, a control condenser for energizing said control electrode when the charge on said control condenser reaches a predetermined value, means responsive to the flow of a welding impulse to the work for charging said control condenser, means for varying the predetermined value of the charge on said condenser required to energize said control electrode whereby a predetermined time delay is secured between the flow of a welding impulse to the work and the energization of said solenoid, means for supplying a low voltage holding current from said source to said solenoid following the discharge of said storage condenser therethrough, a relay having a pair of normally closed contacts in said circuit between said storage condenser and said solenoid, and means effective after a controlled period of time for energizing said relay to disconnect said solenoid from said source and thereby return said pressure control device to its normal position, a second pair of normally closed contacts on said relay adapted to be opened by the energization thereof to open the charging circuit for said control condenser, and a pair of normally open contacts adapted to be closed by the energization of said relay to close a leak circuit across said control condenser.

LLOYD DANIEL RUNKLE.

REFERENCES CITED

The following references are of record in the file of this patent:

UNITED STATES PATENTS

| Number | Name | Date |
| --- | --- | --- |
| 1,902,955 | Holmes | Mar. 28, 1933 |
| 1,915,566 | Younghusband | June 27, 1933 |
| 1,985,107 | Roth | Dec. 18, 1934 |
| 2,145,724 | Horsley | Jan. 31, 1939 |
| 2,257,361 | Yorkey | Sept. 30, 1941 |
| 2,347,714 | Sorensen | May 2, 1944 |
| 2,315,916 | Whiteley et al. | Apr. 6, 1943 |
| 2,340,694 | Rogers | Feb. 1, 1944 |
| 2,363,753 | Smith et al. | Nov. 28, 1944 |